United States Patent
Brooks (10) Patent No.: US 11,348,087 B2
(45) Date of Patent: May 31, 2022

(54) METHODS AND SYSTEMS FOR IDENTIFYING FUNDS TRANSFER OPPORTUNITIES IN ELECTRONIC MEDIA

(71) Applicant: The Western Union Company, Denver, CO (US)

(72) Inventor: Craig Brooks, Walnut Creek, CA (US)

(73) Assignee: The Western Union Company, Denver, CO (US)

( * ) Notice: Subject to any disclaimer, the term of this patent is extended or adjusted under 35 U.S.C. 154(b) by 157 days.

(21) Appl. No.: 16/706,471

(22) Filed: Dec. 6, 2019

(65) Prior Publication Data

US 2020/0184450 A1 Jun. 11, 2020

Related U.S. Application Data

(63) Continuation of application No. 14/577,131, filed on Dec. 19, 2014, now Pat. No. 10,535,056.

(51) Int. Cl.
G06Q 30/00 (2012.01)
G06Q 20/32 (2012.01)
G06Q 20/10 (2012.01)

(52) U.S. Cl.
CPC .............. *G06Q 20/32* (2013.01); *G06Q 20/10* (2013.01)

(58) Field of Classification Search
CPC ....................................................... G06Q 20/32
USPC ......... 705/39, 1.1, 35, 65, 43, 41, 26.82, 44; 455/406, 420, 414.1, 466
See application file for complete search history.

(56) References Cited

U.S. PATENT DOCUMENTS

| | | | | |
|---|---|---|---|---|
| 8,180,705 | B2* | 5/2012 | Kowalchyk | G06Q 20/325 705/39 |
| 2014/0068461 | A1* | 3/2014 | Campbell | G06F 3/048 715/753 |

OTHER PUBLICATIONS

ProQuestDialogNPL Search History.*

* cited by examiner

*Primary Examiner* — John H. Holly
(74) *Attorney, Agent, or Firm* — Kilpatrick Townsend & Stockton, LLP (57) ABSTRACT

A method for identifying a funds transfer opportunity in an electronic media accessed by a mobile device may include monitoring the electronic media for the funds transfer opportunity, identifying the funds transfer opportunity in the electronic media, and outputting indication for the funds transfer opportunity in the electronic media. The method may further include receiving confirmation to instantiate a funds transfer based on the indicated funds transfer opportunity on the mobile device and instantiating the funds transfer based on the received confirmation.

20 Claims, 6 Drawing Sheets

METHODS AND SYSTEMS FOR IDENTIFYING FUNDS TRANSFER OPPORTUNITIES IN ELECTRONIC MEDIA

CROSS-REFERENCES TO RELATED APPLICATIONS

This application is a continuation of U.S. patent application Ser. No. 14/577,131, filed Dec. 19, 2014, and entitled "METHODS AND SYSTEMS FOR IDENTIFYING FUNDS TRANSFER OPPORTUNITIES IN ELECTRONIC MEDIA," which is hereby incorporated by reference, for all purposes, as if fully set forth herein.

BACKGROUND OF THE INVENTION

Social media is becoming ever more prevalent across the world as a tool for electronic communications. With social media, users may network in online communities to share information, personal messages, and other types of content. Within these social networking environments, financial-based exchanges are increasingly desirable. There is a need for infrastructure that facilitates financial transactions within social media environments. This application is intended to address such needs and to provide related advantages.

BRIEF SUMMARY OF THE INVENTION

This invention generally relates to systems and methods for money transfers, and more specifically, to systems and methods for money transfers within electronic media.

In one aspect, the present disclosure provides a method for identifying a funds transfer opportunity in an electronic media accessed by a mobile device. The method may include monitoring, by the mobile device, the electronic media for the funds transfer opportunity, identifying, by the mobile device, the funds transfer opportunity in the electronic media, and/or outputting, by the mobile device, indication for the funds transfer opportunity in the electronic media. The method may further include receiving, by the mobile device, confirmation to instantiate a funds transfer based on the indicated funds transfer opportunity on the mobile device, and/or instantiating, by the mobile device, the funds transfer based on the received confirmation.

Various embodiments of the method may include one or more of the following features. The electronic media may include a social media application. The funds transfer opportunity may be identified in an electronic communication conveyed to the mobile device through or at the social media application. The electronic media may be monitored by a mobile application of the mobile device, whereby the mobile application may be communicatively coupled with a money transfer provider. The mobile application may include a background application that may be selectively enabled and disabled by a user through a user interface of the mobile application. The electronic media may be a foreground application on the mobile device that provides a social network.

Further embodiments of the method may be contemplated to include one or more of the following features. The method may include scanning, by the mobile device, contents of the electronic media for a trigger element indicating the funds transfer opportunity. The contents may include an electronic message delivered to a user of the mobile device via the electronic media. The electronic media may include a social media platform. The trigger element may include at least one of a currency symbol and a textual phrase, whereby the textual phrase may include at least one of a user-based financial detail and financial terminology. The method may further include parsing, by the mobile device, the scanned contents of the user interface display of the electronic media, comparing, by the mobile device, the parsed contents to a trigger element database, and/or determining, by the mobile device, the funds transfer opportunity based on a match between at least a portion of the parsed contents and the trigger element database.

Further, the method may include displaying, by the mobile device, the trigger element for the funds transfer opportunity as a hotlink in the electronic media. The method may include detecting, by the mobile device, a user click to access the hotlink on the mobile device. The method may further include, after receiving the user click to access the hotlink, outputting for display, by the mobile device, a user interface of a mobile application or website for instantiating the funds transfer. Further, the method may include displaying, by the mobile device, an overlay on a portion of the screen of the mobile device for indicating the funds transfer opportunity identified in the electronic media. The overlay may include a textual notification based on the trigger element and a user-input button to instantiate the funds transfer. The method may further include determining, by the mobile device, one or more funds transfer details based on the scanned contents of the user interface display, and/or applying, by the mobile device, the determined one or more funds transfer details to a mobile application or website for instantiating the funds transfer.

Still further, the method may include receiving, by the mobile device, one or more financial details from a user through a user interface on the mobile device during a one-time initial setup. The method may include registering, by the mobile device during the one-time initial setup, one or more electronic media to be monitored for the funds transfer opportunity. Still further, the method may include identifying, by the mobile device, at least one of a sending party and a receiving party of the funds transfer, requesting, by the mobile device, financial details of at least one of the sending party and the receiving party through a communication channel of the electronic media, and/or receiving, by the mobile device, the financial details from the communication channel of the electronic media. Other features of the method may include authorizing, by the mobile device, at least one of the sending party and the receiving party for the funds transfer through the electronic media. Further, the method may include, after initiating the funds transfer, sending, by the mobile device, a receipt confirmation to at least one of a sending party and a receiving party via the electronic media.

In another aspect of the present disclosure, a system for identifying a funds transfer opportunity in an electronic media accessed by a mobile device is provided. The system may include one or more processors and a memory communicatively coupled with and readable by the one or more processors. The memory may have stored therein processor-readable instructions that, when executed by the one or more processors, cause the one or more processors to perform one or more functions to identify the funds transfer opportunity. For instance, the processor-readable instructions may cause the one or more processors to monitor, by the mobile device, the electronic media for the funds transfer opportunity, identify, by the mobile device, the funds transfer opportunity in the electronic media, and/or output, by the mobile device, indication for the funds transfer opportunity in the electronic media. Further, the processor-readable instructions may cause the one or more processors to receive, by the mobile device, confirmation to instantiate a funds transfer based on the indicated funds transfer opportunity on the mobile device, and/or instantiate, by the mobile device, the funds transfer based on the received confirmation.

In yet another aspect of the present disclosure, a computer-readable medium has stored thereon a series of instructions which, when executed by a processor, cause the processor to identify a funds transfer opportunity in an electronic media accessed by a mobile device. The series of instructions may include monitoring, by the mobile device, the electronic media for the funds transfer opportunity and/or identifying, by the mobile device, the funds transfer opportunity in the electronic media. The series of instructions may further include outputting, by the mobile device, indication for the funds transfer opportunity in the electronic media, receiving, by the mobile device, confirmation to instantiate a funds transfer based on the indicated funds transfer opportunity on the mobile device, and/or instantiating, by the mobile device, the funds transfer based on the received confirmation.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Further, specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In general, the systems and methods described herein may promote funds transfer opportunities and services via social media, such as any website or application that enables social networking whereby users interact with each other by creating and sharing information, comments, personal messages, ideas, and other content such as pictures, videos, and so on. It is contemplated that a user accessing such social media via a mobile device may be notified of a funds transfer opportunity when, for instance, a currency amount appears on the screen. The currency amount may be presented as a hyperlink which, upon selection by the user, may open up a funds transfer mobile application. Such applications may be associated with a financial institution, e.g. a Western Union mobile application, and may be used to send or request the currency amount. In another aspect, the systems and methods disclosed herein may be used for payment of online commerce, for instance, to pay for virtual goods, physical goods, donations, services, peer lending, and other goods and services. Other examples and variations are possible, as described further below.

The systems and methods provided herein may enhance collaboration and interaction within social networks by promoting opportunities for funds transfers through automatically identifying such opportunities and presenting them to users. Users may quickly become aware of possible money transfer and/or transfer services, with or without any prior knowledge of the availability of such options. Such users may include social media users, such as social networkers and/or social gamers. The systems and methods may further provide for quick and easy transactions by simplifying initiation of sending or requesting money, locally and/or worldwide, and in some cases during social interactions via mobile devices. Mobile devices may include, but are not limited to, tablet computers, mobile phones, smart phones, smart watches, laptops, computers, and/or any other personal or business electronic devices that may provide access to social networking sites. Such social networks provide environments for blogging, consumer reviews, news sharing, photo and video sharing, gaming, and the like. Example social networks may include, but are not limited to, Facebook, Twitter, YouTube, Quora, Instagram, Google+, MySpace, Yelp, LinkedIn, Vine, Pinterest, Foursquare, and Tumblr, among other online communities. In another example, messaging applications may be monitored for identifying funds transfer opportunities, such as WhatsApp, GChat, WeChat, Viber, Skype, iMessage, and so on.

It is further contemplated that the systems and methods shown may apply to any messages sent through social media channels, and that traditional emails, text messages, and other forms of electronic communication may be monitored for mention of financial transaction opportunities by the systems and methods as described herein. It is contemplated that such systems and methods may be easily disabled by the user. Further, the systems and methods may be initiated by both sending and receiving parties to serve as a secure gateway for authorizing various types of payments, such as mobile-to-mobile, mobile-to-cash, and various other electronic fund transfers. In applications whereby the systems and methods disclosed herein are used for payment in online commerce settings, the systems and methods may offer cost benefits by reducing or eliminating fees that are typically required via other payment platforms. Other examples are possible.

Figure 1:
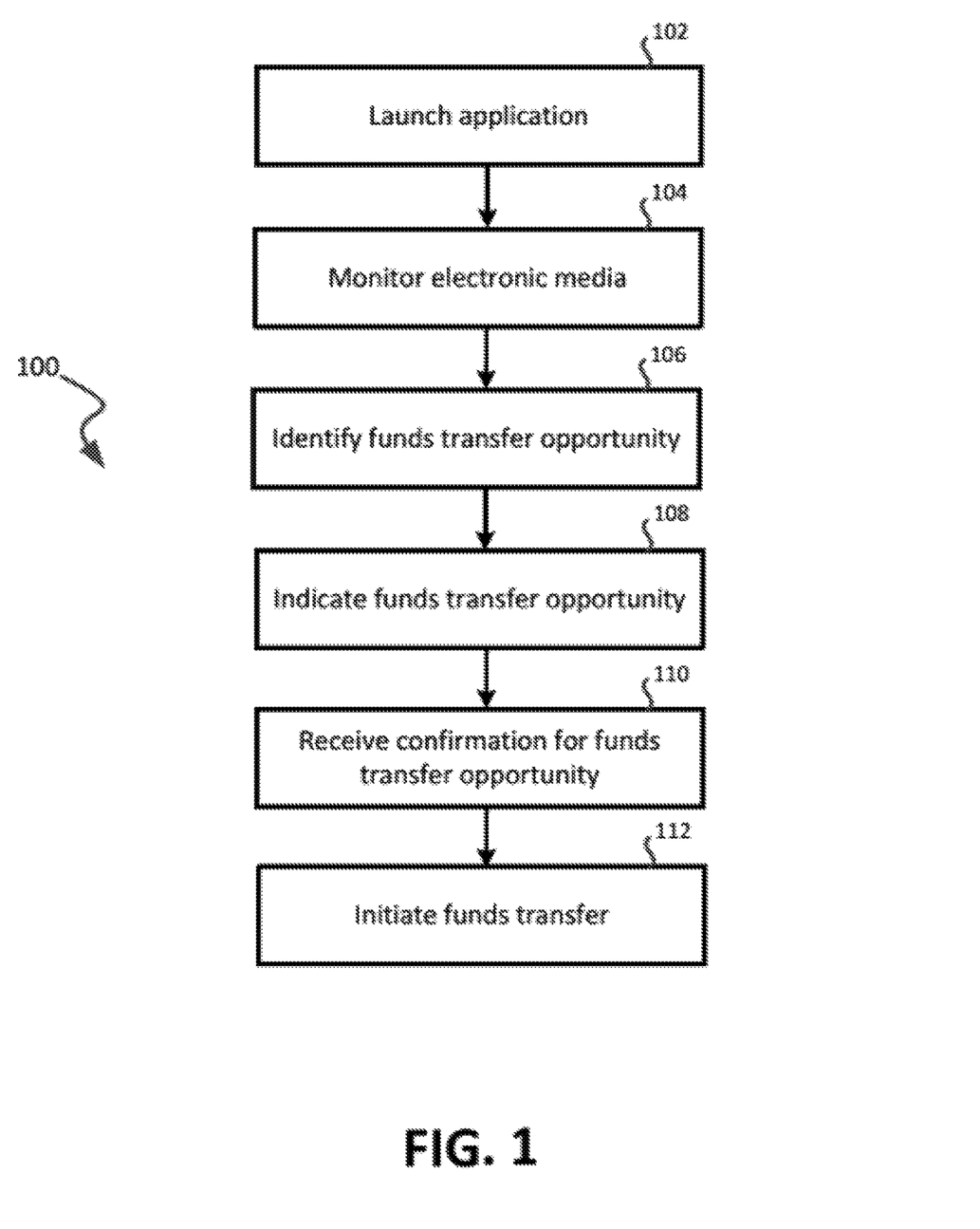
FIG. 1 shows an example method for identifying a funds transfer opportunity in electronic media.

Turning now to FIG. 1, an example method 100 for identifying funds transfer opportunities in electronic media is shown. The method 100 may be implemented by a computer program, such as an application designed to run on a smartphone, tablet computer, or other mobile device. In one example, the mobile application may be a background application, which may be active and running without interfering with other background and/or foreground applications, such as other social media platforms that may be active on the same mobile device. In other examples, the method 100 may be provided for by an applet, such as a JavaScript applet, running on the mobile device concurrently with a browser or other application. It is noted that any of the methods described herein may include additional steps and that any of the steps shown may be optional.

As shown in FIG. 1, the method 100 may include launching the programming application (step 102). As noted previously, the programming application may include a funds transfer application or other money transfer provider service-related mobile application. The funds transfer application may be launched as an application in a background of an operating session of the mobile device. Merely by way of example, launching the programming application into the background state may include detecting, by the mobile device, a user tapping or otherwise selecting an icon representative of the programming application on a display screen of the mobile device. In response to receiving the user tap, the mobile device may load a main user interface file of the application and activate the application to run in the background to monitor events of other electronic media, e.g. other foreground and/or background applications and browsers, as described further below. In the background state, the funds transfer application may actively handle events detected during the monitoring. A sleep state of the funds transfer application may be entered when, for instance, no electronic media is detected by the funds transfer application as being active, running, or otherwise available for monitoring. Further, the user may manually suspend or disable the funds transfer application at any point. It is noted that while the application is enabled or otherwise launched, a user interface file associated therewith may be loaded but not displayed in a window of the mobile device, unless manually called for by the user and/or triggered by an event, as described below.

Further, it is noted that in some cases, prior to launching the funds transfer application, the application is first downloaded by a user to the mobile device and installed during an initial, one-time setup. The one-time setup may include a registration phase that registers the funds transfer application as a tool for the mobile device. The one-time setup may further include requesting, from the user via a user interface of the application, various types of user information, which may be stored locally by the application to a database, or centrally by a money transfer provider system associated with the funds transfer application. In some examples, such account information may be stored in a cloud or other storage medium readily accessible by the funds transfer application. The requested and recorded information may include financial details, identifying information, and/or funds transfer details of the user, including name, address, phone number, email address, a customer number, account information (e.g., stored value account identifier, bank account number and/or ABA routing number), tax number (e.g. Social Security Number or Taxpayer Identification Number), drivers' license number, state ID number, student ID number, mobile device data, a MAC address (media access control address), financial institution names, username and passwords, a personal identification number (PIN), and so on. It is noted that while the funds transfer application may be associated with a particular money transfer provider or financial institution, the same application may be operable with any other financial institutions or branches of the users for identifying and initiating the funds transfers.

In further examples, user information requested during the one-time setup may include receiving user selection regarding particular electronic media programs to be monitored. For instance, the user may select certain social media applications or platforms, such as Facebook and Twitter, and/or specific incoming emails or text messages from certain parties. The user may also choose to not monitor other types of electronic media, e.g. other types of social media which may be active on the mobile device. In some cases, when the user opens a window of the electronic media, the funds transfer application may display a notification, such as a pop-up or drop-down box, indicating that the particular electronic media session is being monitored by the application. Such notifications may also include an on/off button or toggle switch for the user to turn on or off the funds transfer application, e.g. turn on/off monitoring. It is contemplated that the user setup information, such as applications to monitor and financial details, may pertain to a main user of the mobile device having the funds transfer application. Such information may be stored to a user profile. A plurality of user profiles containing different user information may be provided by the same funds transfer application, and a user may be prompted to select the appropriate user profile with a username and/or passcode combination in order to launch the funds transfer application.

In an aspect, during the registration phase and/or at any point of time, the user may register and/or link the funds transfer application to the electronic media provided on the mobile device. Linking may include establishing any rights or permissions with requirements of the various monitored electronic media. In some cases, monitoring may not be allowed for certain electronic media, such as certain social media platforms. In that case, the funds transfer application may still receive user selection of such platforms for monitoring, and send the user selection to a central facility via a communications network to notify the central facility, e.g. money transfer provider service affiliated with the funds transfer application, that monitoring of a particular platform is desired by a customer. The money transfer provider service may be aware of the desire and enable monitoring of such platforms in the future. Further, the registration phase may check that the funds transfer application complies with software requirements of the mobile device that may be needed to perform any of the steps in the method 100. It is contemplated that the funds transfer application may further indicate if an "outdated" electronic media to be monitored is present and notify the user to first update to a newer or latest version of the electronic media prior selecting the electronic media for monitoring. This may ensure that the funds transfer application is compatible and up-to-date with various versions and releases of the different types of electronic media.

The electronic media may be added by the funds transfer application to a "monitoring list" of applications to be monitored, which may be modified by the user at any point. In another aspect, certain electronic media may be added to a "do not monitor" list by the funds transfer application. Further, the one-time initial setup may include setting up a virtual bank or account at the funds transfer application, and linking the virtual account to an actual account at a financial institution of the user. Such approaches may provide for an additional layer of security, whereby any fraudulent or wrong transactions do not immediately affect the user's actual account, but are first reflected and/or verified in the virtual account of the application. It is contemplated that the one-time initial set-up may allow for greater speed and efficiency in identifying and carrying out funds transfers. For instance, funds transfers may be easier and faster if users do not have to re-enter various forms of financial or funds transfer details each time a funds transfer is initiated.

Referring back to FIG. 1, after initiating the application, the method 100 may include monitoring electronic media content for a funds transfer opportunity (step 104). For example, the method may include monitoring an activity, event, message, and/or other type of electronic communication of the electronic media for a mention of a funds transfer opportunity. Such monitoring may include searching for, by the application, a presence of money and/or money-related information in a content of the electronic media. More specifically, such money-related information may include key terms or symbols, such as "pay", "invoice", "bill", "$", "bill pay flow", sender and/or receiver information, and/or user-configurable currency symbols, other symbols, terms, and/or textual phrases. It is contemplated that the currency symbols and/or phrases may be multilingual and multicultural. For instance, a user may select one or more languages or regions to add to a user profile, whereby foreign currency symbols and/or foreign financial phrases discoverable by the funds transfer application to indicate a funds transfer opportunity. In another aspect, the user may enter a key term or phrase, and the funds transfer application may translate the phrase across one or more different languages, and during monitoring, search for the same phrase in multiple languages. In still further aspects, an appropriate language to monitor may be determined by the funds transfer application based on geographical location, for instance, a GPS (global positioning system) location received at the mobile device and determined, by the funds transfer application, to pertain to a certain region having a particular language and/or currency symbols. Furthermore, monitoring the electronic media may include searching for images that appear to resemble bills and other financial-related documents.

Such monitored content may include incoming or outgoing content to and/or from the electronic media through a communications network, such as a mobile network or a WiFi network, among others. In another example, such content may include any information being output on a display screen of the mobile device. In one example, monitoring may include scanning, by the funds transfer application, the contents of the electronic media for a trigger element indicating the funds transfer opportunity. Scanning may include optical recognition techniques to analyze symbols, phrases, terms, and/or images provided in the contents. In some examples, the funds transfer application may parse the scanned contents of the electronic media and/or compare the parsed contents to a trigger element database that stores various trigger elements and/or combinations thereof. If a match is found, between at least a portion of the parsed contents and the trigger element database, then the funds transfer application may determine presence of a funds transfer opportunity. In another aspect, the funds transfer application may use voice recognition techniques to monitor a voice message and/or voice conversation. In that case, the funds transfer application may determine if certain symbols, keywords or phrases are spoken to determine if a funds transfer opportunity is present. Such trigger elements may be dependent based on a language and/or region setting that is detected by the funds transfer application and/or entered by the user.

Monitoring may further include detecting a login, start-up, or other event of the electronic media, such as detecting a login to a social media account. It is contemplated that several electronic media may be monitored simultaneously. Further, it is contemplated that the funds transfer application may monitor one or more electronic media applications continuously in periodic intervals, and that such monitoring may be paused or stopped upon user instruction and/or detection of an inactive state of the monitored electronic media.

As shown in FIG. 1, the method 100 may further include identifying a funds transfer opportunity (step 106) in the monitored content of the electronic media. For instance, the funds transfer application may identify, via monitoring the content, one or more trigger elements, such as any of the money-related information described above. In some cases, a particular combination of trigger elements may indicate a type of money transfer opportunity, for instance, whether the opportunity would be for lending money to a friend, purchasing a virtual gaming item, and so on. Merely by way of example, a monitored message content received at the electronic media application, e.g. social media application, may show, "Hey mom, I need $200 for an emergency!" The funds transfer application may recognize "$200" and/or the currency symbol "$" and determine that a funds transfer opportunity is present. In another example, the funds transfer application may use context surrounding such symbols to determine that the funds transfer opportunity is present, and/or a type of funds transfer opportunity that is present. For example, the funds transfer application may recognize the term "need" or phrase "I need" followed by "$200" and determine the funds transfer opportunity.

As further shown in FIG. 1, upon identifying the funds transfer opportunity, the method 100 may include indicating the funds transfer opportunity to inform the user of the mobile device (step 108). In one example, the funds transfer application may display one or more trigger elements, such as "$200", as a hotlink to indicate the financial transfer opportunity. Indicating may further include presenting an option to trigger a process for the funds transfer along with the hotlink. Such options may be provided by an overlay window. For example, the funds transfer application may display an overlay on a portion of the screen of the mobile device for indicating the financial transfer opportunity. The overlay may include textual notification based on the trigger element, such as the trigger element itself, and/or a user-input button to instantiate the funds transfer. In some aspects, the overlay may further include a message or prompt for the user, such as a confirmation questioning if the user would like to continue with a funds transfer. In another aspect, the overlay may be a pop-up bar that is solid and/or semi-transparent, or a pop-up window, which may disappear after a predetermined period of time. In another example, a combination of a hotlink and an overlay bar may be provided. For instance, the hotlink may comprise the trigger element and be displayed in the overlay. In a different aspect, indicating the funds transfer opportunity may include emitting sounds and/or haptics, such as vibrations, by the mobile device under instruction of the funds transfer application.

Referring again to FIG. 1, the method 100 may further include receiving confirmation from the user for the funds transfer opportunity (step 110). For instance, the funds transfer application may receive a user tap to access the hotlink on the mobile device, such as clicking on the hotlinked currency amount to send money. In one example, the hotlink points to a telephone number of a money transfer provider, such that clicking on the hotlink establishes a voice connection with the money transfer provider service for instantiating the funds transfer. In other aspects, clicking on the hotlink may initiate a voice-over-internet-protocol ("VoIP") connection with the money transfer provider. In another aspect, receiving user confirmation, e.g. clicking the hotlink, may cause the mobile device to output for display a user interface of the funds transfer application or a website for instantiating the funds transfer. For instance, the hotlink may link to a website of the money transfer provider, e.g. a Western Union website, and/or to a splash page that serves as an initial website page that appears for a short time prior to leading in to the Western Union website. Such splash pages may include further user instruction, such as a list of information needed for entry to continue with a funds transfer, and/or advertisements, such as a notification to the user regarding the money transfer provider's available services and/or fees. Further, it is contemplated that such information on the hotlinked webpage(s) may be based on the trigger element identified by the funds transfer application.

Still referring to FIG. 1, upon receiving user confirmation, the funds transfer application may initiate the funds transfer (step 112). Initiation or instantiation may occur in numerous different ways, as described herein. An electronic funds transfer may be initiated involving actual currency and/or virtual currency between two or more parties. In one example, the funds transfer application utilizes the monitored content in the electronic media to gather various funds transfer details for filling out electronic forms and/or passing such details to the central money transfer provider. Such details may include a sender and/or receiver identification, an amount, authentication details, and so forth as described above. Merely by way of example, determining one or more financial details may be based on the scanned contents of the user interface display and applying the determined one or more financial details to a mobile application or website for instantiating the funds transfer. The funds transfer application may further query other parties via communication channels in the electronic media for financial details. More specifically, in one example, the funds transfer application may identify at least one of a sending party and a receiving party of the financial transfer, request financial details of at least one of the sending and receiving parties, and receive the details at the social media application. Such details may further be pulled from the social media application into the funds transfer application, and/or subsequently transferred from the funds transfer application to the money transfer provider website.

It is contemplated that the funds transfer may include movement of electronic funds, and/or electronic to cash, whereby the user sends money now and a receiving party picks up the money at a later time. Still in other aspects, the funds transfer application may be configured to follow various regulations, such as any regulations applied to disclosures, cancellation rights, liabilities for unauthorized transfers, and/or error resolution procedures. For instance, the funds transfer application may provide pop-up windows to inform users of their cancellation procedures, any security issues detected by the funds transfer application, associated fees, and so on. Further, the funds transfer application may authenticate the receiving party through various authentication means.

It is contemplated that other steps may be included in the method 100 of FIG. 1. For instance, the method 100 may include detecting when the connection or security of the mobile device to a communication network is being compromised, and stop the funds transfer procedure accordingly. The method 100 may further include, after initiating the funds transfer, sending a receipt confirmation to at least one of a sending party and a receiving party, such as another social networker or social gamer, via the electronic media. The receipt confirmation may comply with any financial regulations to show amount being transferred and associated service fees. In another aspect, the receipt confirmation represents a notification regarding a status of the funds transfer. Such statuses may include a cancellation status, error status, and/or further instructions for the party to implement in order to complete the funds transfer. In still other aspects, the method 100 may authorize at least one of the sending party and the receiving party for the financial transfer through the electronic media. Still, in another example, the funds transfer application may determine that the sending and/or receiving parties have been involved in previous funds transfers with one another or with other parties. In that case, the funds transfer may be further streamlined. For example, upon user confirmation at the mobile device to initiate the funds transfer, the funds transfer application may automatically utilize previously-determined information to complete the funds transfer in fewer steps.

It is contemplated that the method 100 may provide a quick and efficient funds transfer infrastructure that facilitates money transfers and provides payment options across various types of electronic media. In one aspect, the electronic media includes social media, whereby funds are transferred between social networkers and/or social gamers. The method 100 may operate across different social media platforms in all countries by supporting multi-country money transfers.

Figure 2:
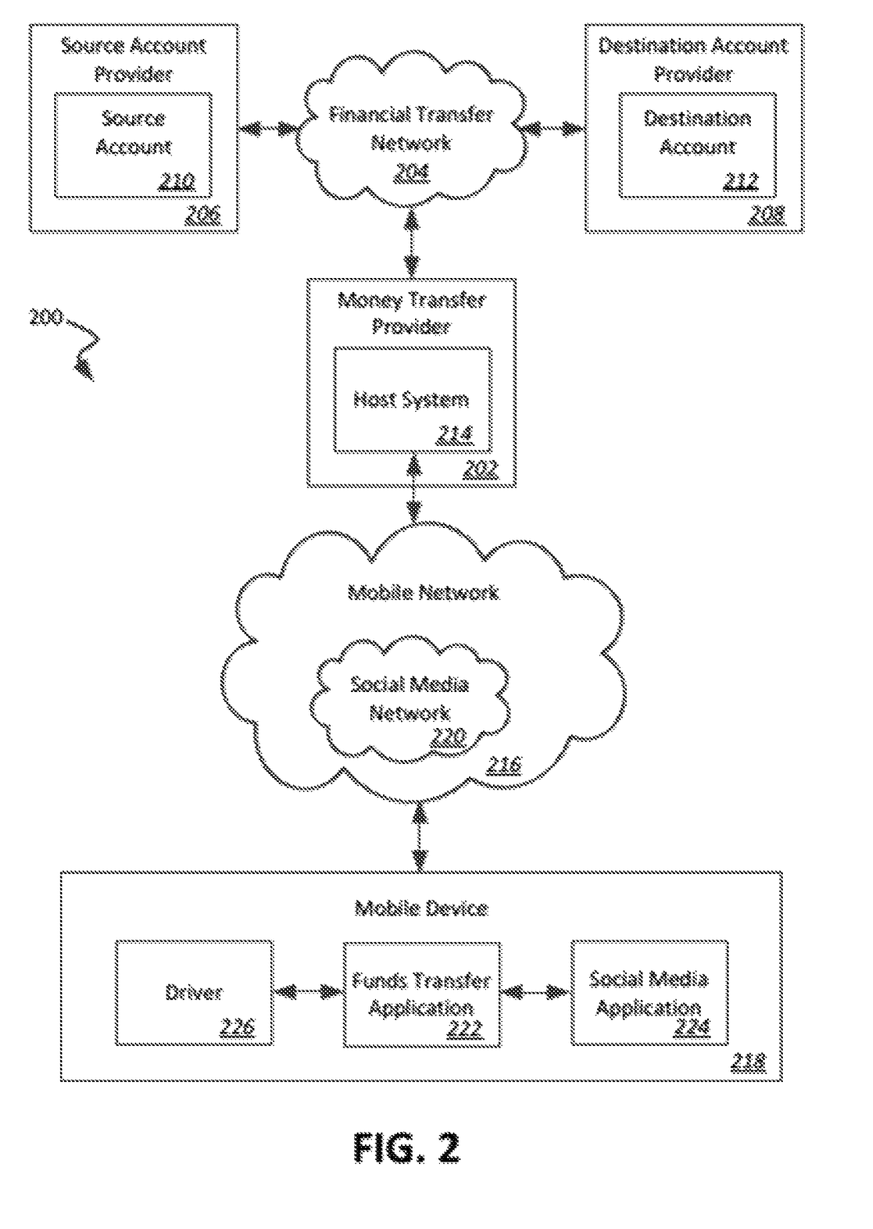
FIG. 2 shows an example system for identifying a funds transfer opportunity in electronic media.

Turning now to FIG. 2, a block diagram illustrating an example system 200 for making financial transfers with the funds transfer application is shown, according to various embodiments of the present application. The system 200 may include a money transfer provider system 202, e.g. systems operated by Western Union or another money transfer provider service. The money transfer provider 202 may be communicatively coupled with a financial transfer network 204. Also communicatively coupled with the financial transfer network 204 may be one or more account providers 206 and 208, which may maintain, control, or otherwise manipulate source and destination accounts 210 and 212, respectively. The source account 210 may be any of a variety of accounts, such as a traditional bank account, in which case source account provider 206 may be a financial institution. According to other embodiments, the source account 210 may be a virtual (or e-money) wallet, in which case the source account provider 210 may be a mobile operator or agent. Similarly, the destination account 212 may be any of a variety of accounts, such as a bank or virtual (e-money) account, and the destination account provider 208 may be a financial institution, mobile operator, or agent accordingly. Additionally, as explained in embodiments detailed herein, a recipient of a money transfer may also receive the money in cash at a regular agent location. Such agents may comprise an individual, group, retail location, or other entity that allows customers to access services of the money transfer provider 202. Generally speaking and as understood by one skilled in the art, the money transfer provider 202 may access the source account 210 of one account provider 206 and/or the destination account 212 of the same or a different account provider 208 to affect a transfer from and/or to the accounts 210 and 212 via the financial transfer network 204.

The money transfer provider system 200 may also be adapted to identify the entities and/or accounts associated with a transaction and/or determine a destination for a payment of the transaction. For example, the entities and/or accounts may be identified based on data maintained in a verification database or other repository, which may be maintained internally or externally to the money transfer provider system 202. In one example, the verification database may be maintained by a host system 214 of the money transfer provider 202.

The system 200 may further include a mobile network 216, such as a cellular or other wireless network, communicatively coupled with a mobile device 218 and the money transfer provider 202, or more specifically, the host system 214 at the money transfer provider 202. The mobile network 216 may further include, provide, or otherwise be connected to, other networks, such as a social media network 220 that provides access to various social media platforms, which may include of those described above. It should be understood that while only one mobile network 216 and only one social media network 220 are illustrated here for the sake of simplicity and clarity, multiple mobile networks 216 and/or social media networks 220 may be present. Also, it should be understood by someone having ordinary skill in the art that the communicative link between mobile device 218 and money transfer provider 202 may include additional communication networks and/or conduits. The money transfer provider 202 need not directly interface with the mobile network 216. For example, mobile device 216 may access the Internet through the mobile network 216, allowing a funds transfer application 222 to communicate with the money transfer provider 202 and/or the host system 214 thereof. The money transfer provider system 202, on the other hand, might access the Internet to receive the communication through a variety of means, which can include non-mobile networks, such as fiber-optic, coaxial cable, and/or other hard-wired means. It will be understood by one having ordinary skill in the art that the system 200 represents some embodiments of the invention, and that the invention allows for a variety of other configurations.

As further shown in the system 200 of FIG. 2, the mobile device 218 may further comprise, among other hardware and software elements, one or more social media applications 224 and a driver 226. The driver 226 may control the output, display screen, and other aspects of the mobile device 218, such as by receiving and implementing instructions based on the funds transfer application 222. One or more social media applications 224 may be installed on the mobile device 218. It is noted that the social media application 224 shown may represent any other form of electronic media. The funds transfer application 222 may monitor and communicate directly with the social media application 224 as described previously, such as by sending signals, receiving and/or sending contents, and the like. Further, it is noted that other communication channels may exist that are not explicitly shown. For instance, the driver 226 may interact directly with the social media application 224. In one example, the mobile device 218 is a sending party's device, and the receiving party is communicatively connected via communication channels through the social media application 224. In another example, the mobile device 218 is a receiving party's device, and the sending party is connected thereto via the social media application 224. Other examples are possible.

Figure 3:
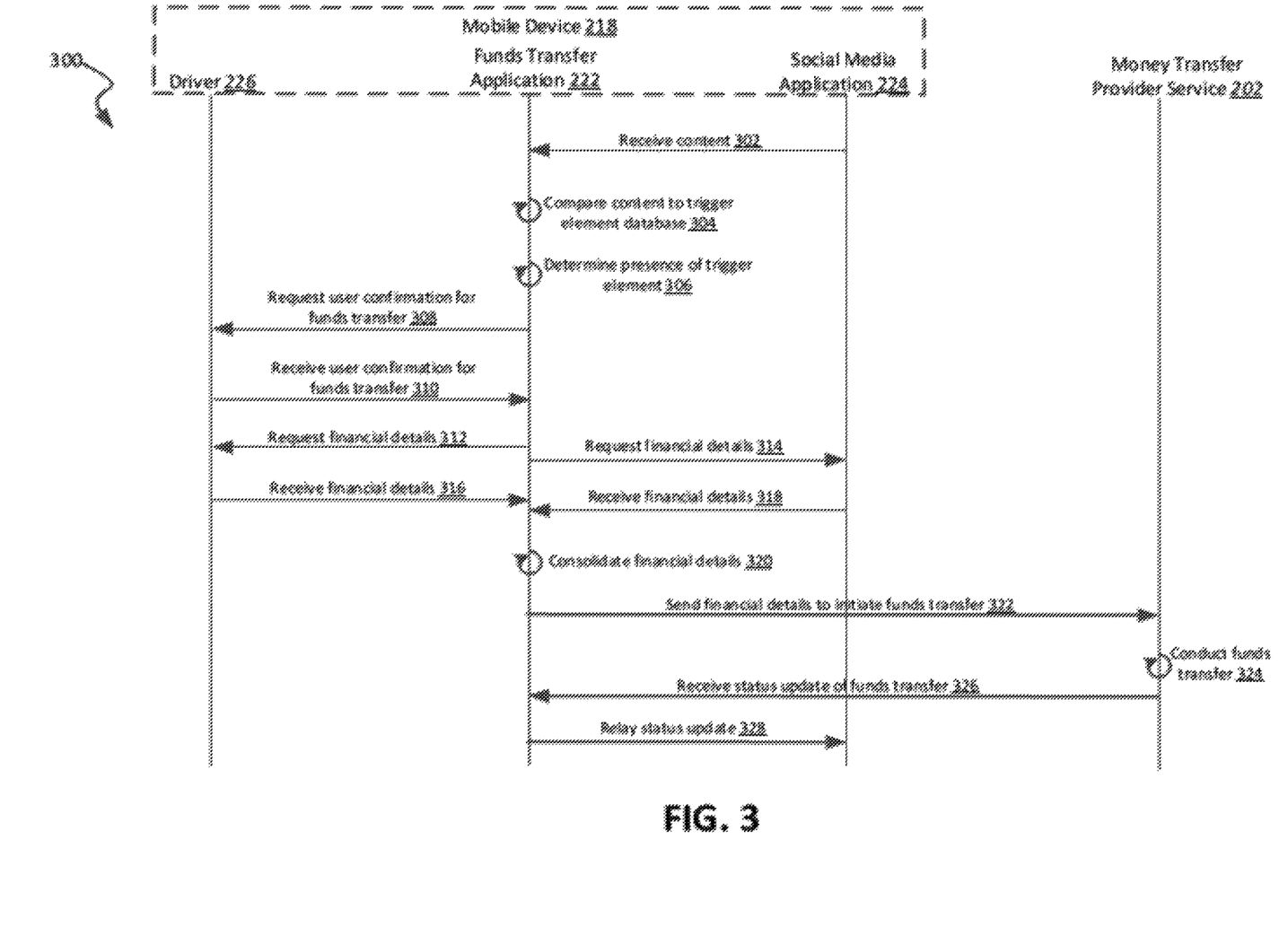
FIG. 3 shows an example communications sequence for identifying a funds transfer opportunity in electronic media.

Turning now to FIG. 3, a diagram illustrating an example process 300 that may be operated within the system 200 of FIG. 2 is shown. The process 300 may include communications between the driver 226, the funds transfer application 222, and the social media application 224 at the mobile device 218 with the money transfer provider service 202. The process 300 may include receiving, at the funds transfer application 222, content from the social media application 224 (step 302). Such content may be sent by the social media application 224 automatically at various time intervals and/or pulled by the funds transfer application 222 during a monitoring session. In some aspects, the funds transfer application 222 may detect a change in content at the social media application 224 and request or otherwise retrieve the content for subsequent analysis. It is noted that although one social media application 224 is shown interacting with the funds transfer application 222, a plurality of social media applications 224 may be monitored concurrently.

Once the funds transfer application 222 receives the content, the funds transfer application 222 may compare the received content to a trigger element database (step 304). The trigger element database may be stored locally at the mobile device 218 and/or retrieved through a cloud network, such as via the mobile network 216. It is contemplated that the trigger element database may be periodically updated, for instance, by the money transfer provider service 202 and/or by user configuration through the funds transfer application 222 to include relevant and up-to-date trigger elements. It is further contemplated that comparing the content may include scanning the content, parsing the content into separate symbols and/or phrases, and comparing, by the funds transfer application 222, each piece of content individually to the trigger element database.

In the example as shown in FIG. 3, the funds transfer application 222 may identify or otherwise determine presence of a trigger element (step 306). For instance, the funds transfer application 222 may determine one or more matches between the examined content and the trigger element database. In that case the funds transfer application 222 may send a request to the driver 226 to request user confirmation for a funds transfer (step 308). Other aspects are possible. For instance, the funds transfer application 222 may instruct the driver 226 to notify, via a pop-up box and/or hotlink of an identified amount to transfer, the user of the funds transfer opportunity by outputting the notification for display on a display screen of the mobile device 218. Furthermore, it is contemplated that while the request for user confirmation for the funds transfer is being sought, the funds transfer application 222 may continue to monitor the social media application 224 and/or other applications for any changes and/or other funds transfer opportunities.

In response to querying for user confirmation, the funds transfer application 222 may receive, from the driver 226, the user confirmation for the funds transfer (step 310). As described previously, such user confirmation may include detecting a click or access of the hotlink by the user. Other and/or additional user confirmation input may be received. The funds transfer application 222 may further instruct the driver 226 to request any financial details from the user, for example through a user interface of the funds transfer application 222 (step 312), and receive the details from the user (step 316). In another aspect, the funds transfer application 222 instruct the driver 226 to retrieve such details from a database and/or from the money transfer provider service 202. At about the same time, the funds transfer application 222 may request financial details from the social media application (step 314) and subsequently receive such details from the application (step 318). It is contemplated that either the funds transfer application 222 and/or the social media application 224 may represent a sending and/or receiving party. For instance, the received information from social media application 224 may include information from a sending and/or receiving party.

The funds transfer application 222 may gather the received financial details (step 320) and subsequently send such details to the money transfer provider service 202 to initiate the funds transfer (step 322). Subsequently, the money transfer provider service 202 may perform additional authentication steps of either or both sending and receiving parties, and conduct the funds transfer (step 324). While, and/or after, the funds transfer is underway, the funds transfer application 222 may receive one or more status updates of the funds transfer from the money transfer provider service 202 (step 326). Such status updates may include any errors, additional information needed, estimated time for completion of the funds transfer, and/or a receipt confirmation of a completed transfer. The funds transfer application 222 may subsequently relay the updates to the second party via a communication channel of the social media application 224 by providing the status update(s) to the application 224 (step 328). Further, such updates may be sent to the driver 226 for output on a display screen to update the user of the mobile device 218. Other steps are possible.

Figure 4:
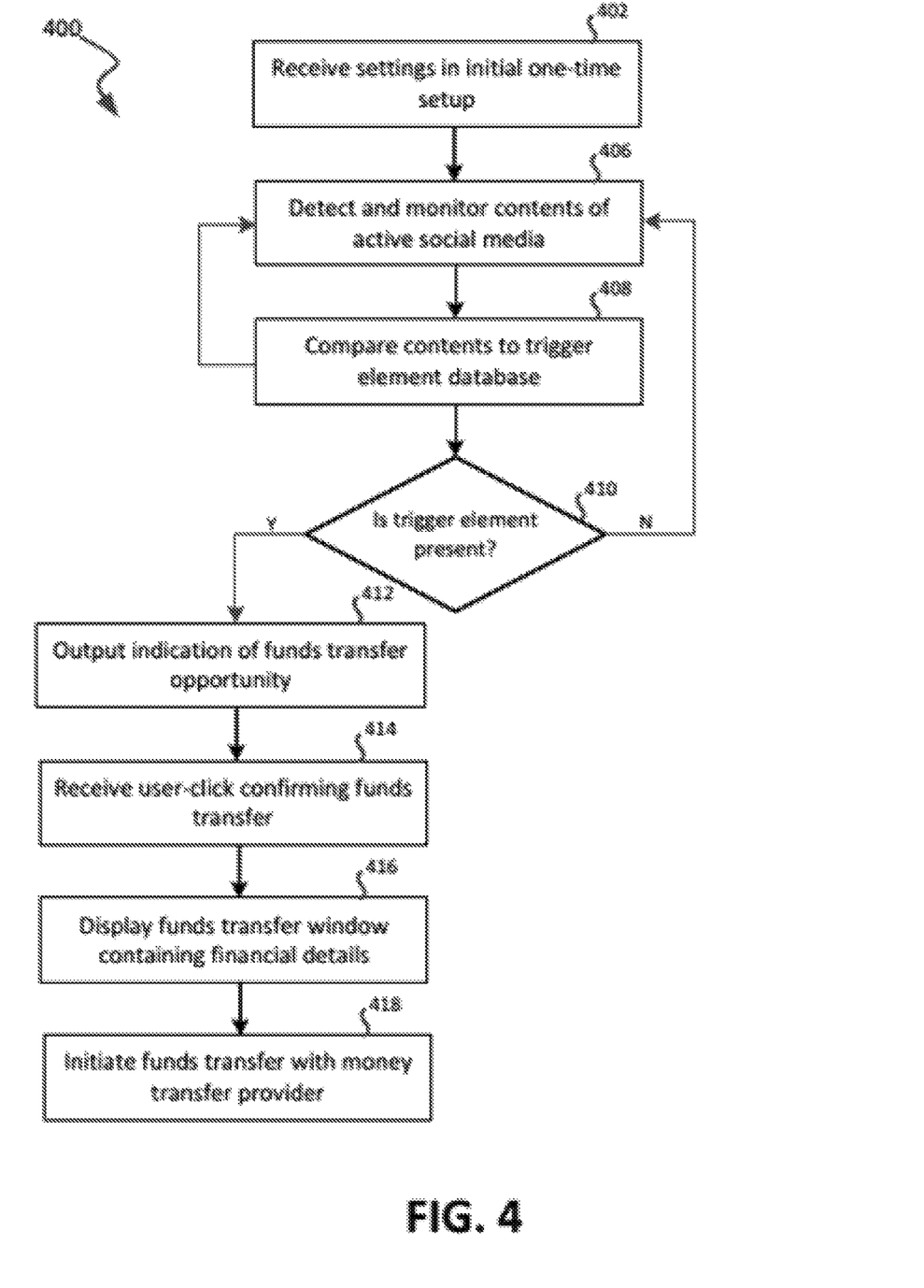
FIG. 4 shows another example method for identifying a funds transfer opportunity in electronic media.

Turning to FIG. 4, another example method 400 that may be implemented by the funds transfer application 222 is illustrated. It is contemplated that any of the steps shown herein may be optional, rearranged, and/or replaced, and further, that additional steps may be incorporated that are not explicitly shown. Further, the method 400 may include any features and/or steps described above.

The method 400 may include receiving settings in an initial, one-time setup procedure (step 402). Further, the method 400 may include detecting and/or monitoring contents of an active social media application (step 406). The method 400 may further include comparing the monitored contents to a trigger element database (step 408) and based on the comparison, determine if a trigger element is present (step 410). If a trigger element is not present, the method 400 may include continuously detecting and monitoring contents of various active social media, or other electronic media.

At step 410, if a trigger element is determined to be present, the method may proceed to output an indication of a funds transfer opportunity 412. In response, the method 400 may include receiving a user-click to confirm proceeding with a funds transfer (step 414). In another aspect, if nothing is received or detected after a predetermined period of time, the method may include removing the funds transfer opportunity indicator, which may cause a notification or overlay being shown on a display screen of a mobile device to disappear. However, upon receiving the user-click, the method 400 may include displaying a funds transfer window containing the financial details needed for the funds transfer, and/or blanks, such as a form, for receiving user-input regarding financial details (step 416). Additional confirmation steps and/or authorization processes may be included. The method 400 may further initiate the funds transfer based on the collected financial details by sending such details and/or otherwise communicating with the money transfer provider (step 418). In some examples, initiating the funds transfer may include providing further instructions for the user of the funds transfer application to complete the funds transfer. Other embodiments are possible.

Figure 5:
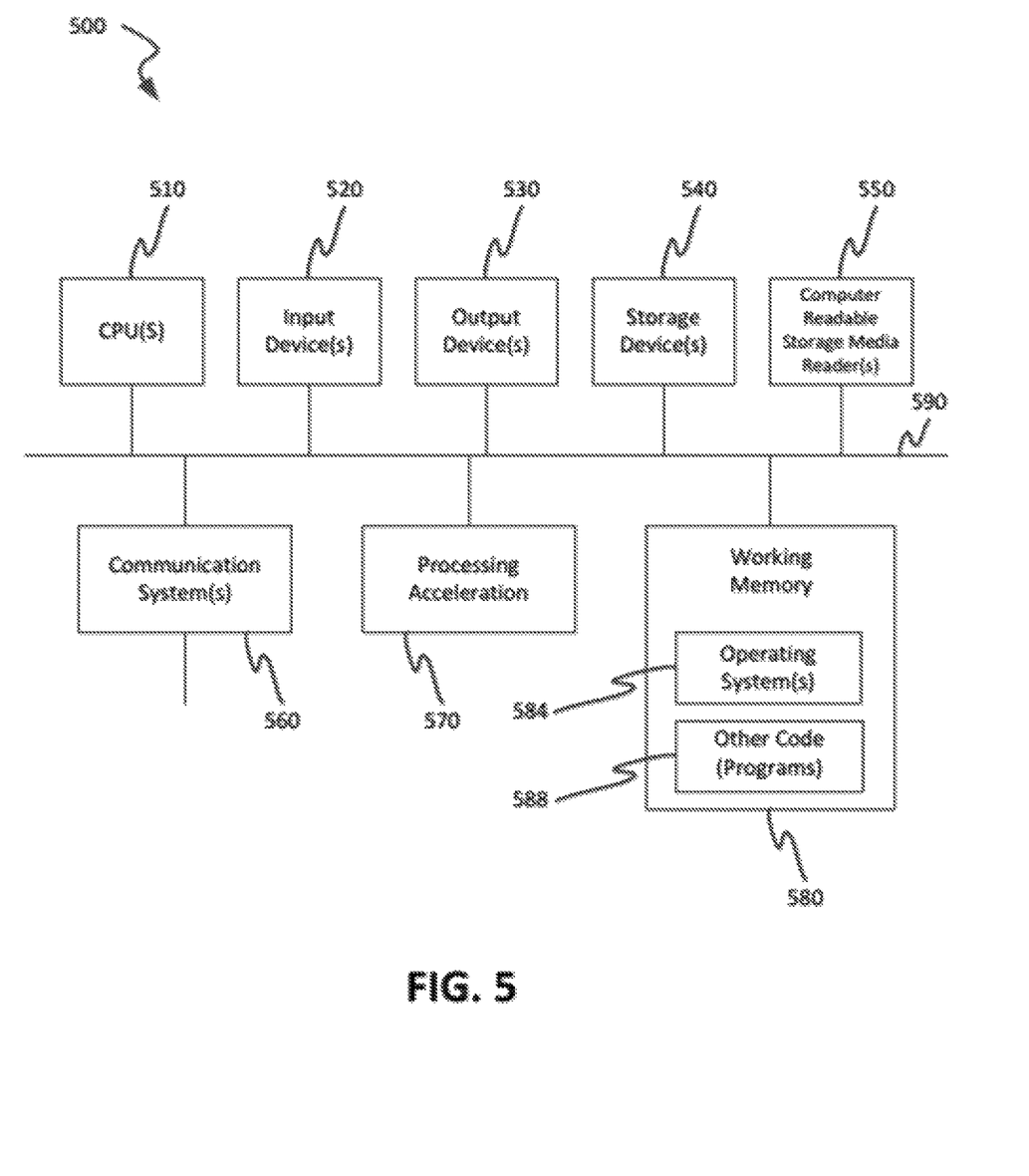
FIG. 5 shows an example computer architecture upon which various aspects of the present invention may be implemented.

Turning now to FIG. 5, a block diagram is shown illustrating a computer system upon which embodiments of the present invention may be implemented. This example illustrates a computer system 500 such as may be used, in whole, in part, or with various modifications, to provide the functions of the funds transfer application 222, social media application 224, driver 226, mobile device 218, and/or other components of the invention such as those discussed in FIGS. 1-4.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more storage device 540. By way of example, storage device(s) 540 may be disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within a working memory 580, including an operating system 584 and/or other code 588. It should be appreciated that alternate embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 500 may include code 588 for implementing any or all of the function of the various elements of the architecture as described herein. For example, software, stored on and/or executed by a computer system such as system 500, can provide the functions of any of the print function applet, and/or other components of the invention such as those discussed above.

Figure 6:
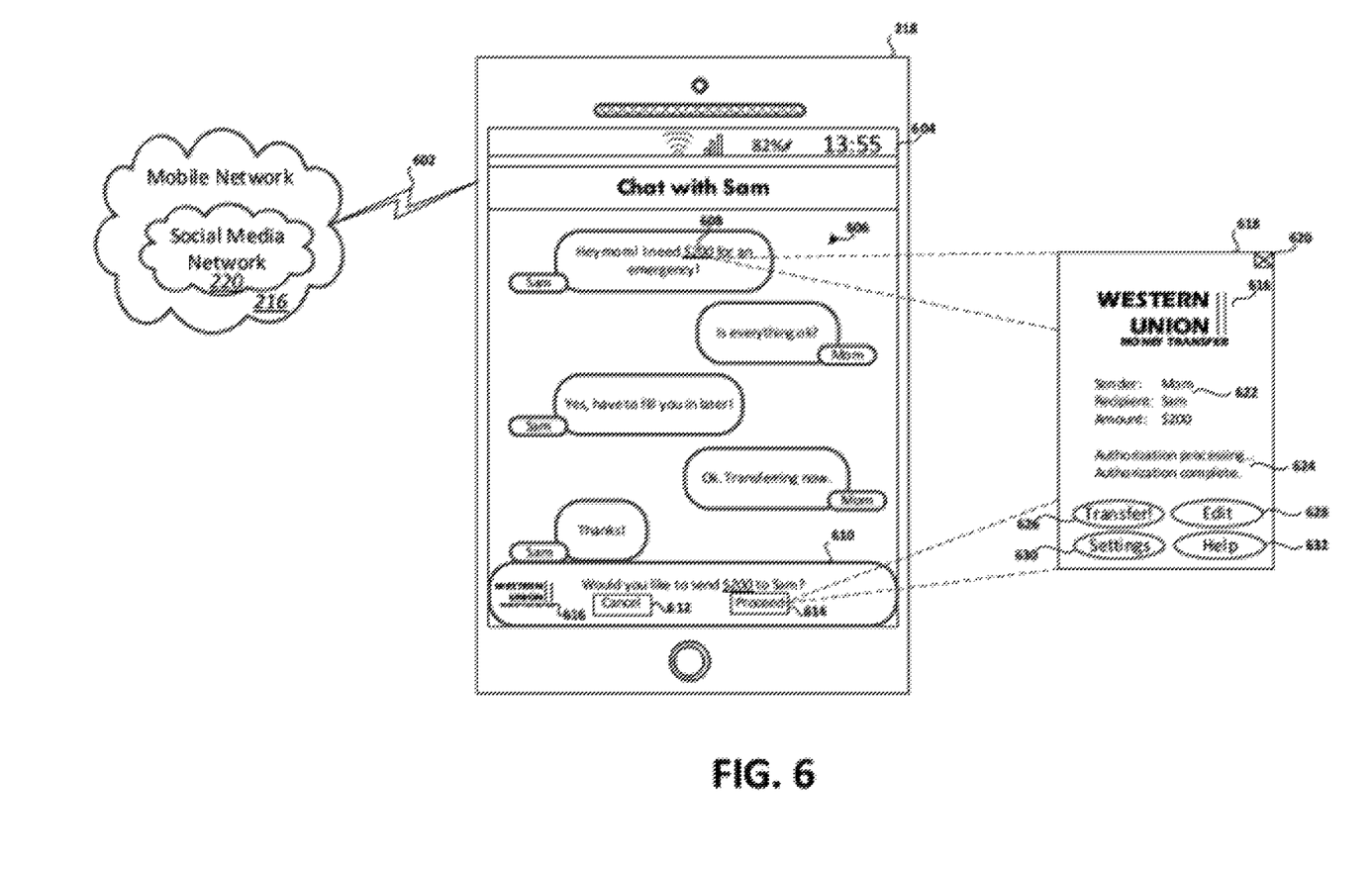
FIG. 6 shows an example components of an example user interface according to various embodiments of the present disclosure.

Turning now to FIG. 6, an example user interface that may be displayed on the mobile device 218 by the funds transfer application 222 of FIG. 2 is shown. The mobile device 218 may be connected by a wireless communication channel 602 to the mobile network 216, which may include or be further linked to the social media network 220. The communication channel 602 may comprise any cellular connection, WiFi, and/or internet connection. The mobile device 218 may include a touch display screen 604 that shows a chat window 606 from a social media application on the mobile device 218. It is contemplated that the chat window 606 shows communications received from the social media network 220.

As shown in FIG. 6, the mobile device 218, and/or more specifically the funds transfer application 222, may identify a funds transfer opportunity in the social media application. In this case, a trigger element 608 indicating the funds transfer opportunity may be a transfer amount, "$200", that was detected in an incoming message. As soon as the trigger element 608 is detected by the funds transfer application 222, the funds transfer application 222 may indicate the funds transfer opportunity by displaying the trigger element 608 as a hotlink and/or by displaying an overlay 610. It is contemplated that the trigger element 608 is detected at about the same time or shortly after it appears on the display screen 604.

The overlay 610 may be a semi-transparent and/or opaque pop-up box that spans a portion of the display screen 604 and may automatically disappear either after a predetermined period of time, by clicking a cancel button 612, and/or by tapping elsewhere on the display screen 604. The overlay 610 may include a message to the mobile device user that includes the trigger element 608, such as "Would you like to send $200 to Sam?" The overlay 610 may further include the cancel button 612 and/or a proceed button 614 to receive confirmation of the funds transfer. In another aspect, the overlay 610 may include a logo 616 of a money transfer service provider, e.g. Western Union, that is affiliated with the funds transfer application 222. It is contemplated that to confirm the funds transfer, the user may tap on the hotlinked trigger element 608 provided in the chat window 606 and/or on the proceed button 614 of the overlay.

Further as shown in FIG. 6, it is contemplated that the hotlinked trigger element 608 and/or the proceed button 614 may point to a pop-up window, such as a funds transfer user interface ("UI") 618 of the funds transfer application 222 and/or of a website associated with the money transfer provider service. The funds transfer UI 618 may include the logo 616 of the money transfer provider service and/or an exit box 620 to cancel the funds transfer and return to the chat window 606. The funds transfer UI 618 may further display financial details 622, such as a sender, a recipient, an amount, and/or any other financial details which may be found in foregoing descriptions. In some cases, some financial detail entries may appear blank, and/or otherwise indicate that such details must be input by the user of the mobile device 218 and/or are being retrieved by the funds transfer application 222. In another aspect, a status line 624 containing one or more statuses on the funds transfer may be provided. In the example shown, the status line 624 may indicate an authorization process that is pending, and then completed. In some aspects, the status line 624 may indicate other messages, such as "Funds transfer complete," "Error—bad connection," "Error—insufficient funds," and/or any other message. Other examples are possible.

The funds transfer UI 618 may further include various buttons that may be linked to other windows and/or cause other actions to occur. In one example, a transfer button 626 is provided, which may be grayed-out and unselectable until an "authorization complete" message appears in the status line 624. By pressing on the transfer button 626, the funds transfer application 222 may send a funds transfer request, including any required financial details 622, to the money transfer service provider via the mobile network 216. An edit button 628 may be provided to allow the user to modify any of the financial details 622. For instance, the user may change the amount to a different amount other than the one detected in the chat window 606. A settings button 630 may be provided to allow the user to access and configure settings of the funds transfer application 222. For instance, the user may turn on or off monitoring of various electronic media, block monitoring of certain electronic media and/or media associated with particular people, and so on. Other examples are possible.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for identifying content of a social media interaction, the method comprising:
   receiving, by a mobile application executing on a mobile device, an indication of a social media application, the indication identifying that the mobile application is authorized to monitor the social media application;
   detecting, by the mobile application, content of the social media application executing on the mobile device;
   identifying, by the mobile application, a trigger element input within the content of the social media application;
   in response to identifying the trigger element within the content of the social media application, outputting, by the mobile application for presentation on a display of the mobile device, an overlay window displaying the trigger element as a selectable hotlink;
   receiving, by the mobile application, a selection indication indicating a selection of the selectable hotlink within the overlay window; and
   loading, by the mobile application, a user interface for a transfer application in response to the selection indication.

2. The method of claim 1, further comprising:
   simultaneously displaying, by the mobile device, the overlay window with the mobile application.

3. The method of claim 1, wherein the content of the social media application is selected from a group consisting of public messages, private messages, a picture, and an event notification.

4. The method of claim 1, further comprising:
   initiating, by the transfer application, a funds transfer procedure;
   detecting, by the mobile application, a connection of the mobile device to a communication network;
   determining, by the mobile application, that the connection is compromised; and
   stopping, by the mobile application, the funds transfer procedure based on the connection.

5. The method of claim 1, further comprising:
   determining a language for detecting the content of the social media application, wherein determining the language is based on a geographic location of the mobile device.

6. The method of claim 1, wherein the selectable hotlink corresponds to a financial provider.

7. The method of claim 1, wherein the trigger element is selected from a group consisting of a currency symbol, a textual phrase, and financial terminology.

8. The method of claim 1, further comprising:
   parsing, by the mobile application, the content of the social media application;
   comparing, by the mobile application, the parsed content to a trigger element database; and
   determining, by the mobile application, the selectable hotlink based on a match between at least a portion of the parsed content and the trigger element database.

9. The method of claim 1, further comprising:
   after loading the user interface for the transfer application, sending, by the mobile application, a confirmation to at least one of a sending party and a receiving party via the social media application.

10. A system for identifying content of a social media interaction, the system comprising:
    one or more processors; and
    a memory communicatively coupled with, and readable by, the one or more processors and having stored therein processor-readable instructions that, when executed by the one or more processors, cause the one or more processors to:
    receive, by a mobile application, an indication of a social media application, the indication identifying that the mobile application is authorized to monitor the social media application;
    detect, by the mobile application, content of the social media application executing by the one or more processors;
    identify, by the mobile application, a trigger element input within the content of the social media application;
    in response to the identification of the trigger element within the content of the social media application, output, by the mobile application for presentation on a display, an overlay window displaying the trigger element as a selectable hotlink;
    receive, by the mobile application, a selection indication indicating a selection of the selectable hotlink within the overlay window; and
    load, by the mobile application, a user interface for a transfer application in response to the selection indication.

11. The system of claim 10, wherein the processor-readable instructions further cause the one or more processors to:
    monitor, by the mobile application, the social media application executing by the one or more processors; and
    detect, by the mobile application, a login or start-up of the social media application.

12. The system of claim 10, wherein the processor-readable instructions further cause the one or more processors to:
    initiate, by the transfer application, a funds transfer procedure;
    detect, by the mobile application, a connection security of a mobile network;
    determine, by the mobile application, that the connection security of the mobile network is compromised; and
    stop, by the mobile application, the funds transfer procedure based on the connection.

13. The system of claim 10, further comprising:
    a global position system (GPS) receiver; and
    wherein the processor-readable instructions further cause the one or more processors to:
    determine, using the GPS receiver, a location of the system; and
    determine, by the mobile application, a language for detecting the content of the social media application based on the location.

14. The system of claim 10, wherein the processor-readable instructions further cause the one or more processors to:
    parse, by the mobile application, the content of the social media application;

compare, by the mobile application, the parsed content to a trigger element database; and determine, by the mobile application, the selectable hotlink based on a match between at least a portion of the parsed content and the trigger element database.

15. The system of claim 10, wherein the processor-readable instructions further cause the one or more processors to:

after loading the user interface for the transfer application, send, by the mobile application, a confirmation to at least one of a sending party and a receiving party via the social media application.

16. The system of claim 10, wherein the processor-readable instructions further cause the one or more processors to:

receive, by the user interface loaded on the display, an indication to initiate a funds transfer procedure;

initiate, by the transfer application, the funds transfer procedure; and send, by the mobile application, a confirmation to a sending party of the funds transfer procedure.

17. A non-transitory, computer-readable medium having stored thereon a series of instructions which, when executed by one or more processors of a mobile device, cause the one or more processors to:

receive an indication of a social media application, the indication identifying that one or more processors are authorized to monitor the social media application;

detect content of the social media application executing on the mobile device;

identify a trigger element input within the content of the social media application;

in response to the identification of the trigger element within the content of the social media application, output for presentation on a display of the mobile device, an overlay window displaying the trigger element as a selectable hotlink;

receive a selection indication indicating a selection of the selectable hotlink within the overlay window; and load a user interface for a transfer application in response to the selected indication.

18. The non-transitory, computer-readable medium of claim 17, further comprising instructions which, when executed by the one or more processors of a mobile device, cause the one or more processors to:

initiate a funds transfer procedure;

detect a connection of the mobile device to a communication network;

determine that the connection is compromised; and stope the funds transfer procedure based on the connection.

19. The non-transitory, computer-readable medium of claim 17, further comprising instructions which, when executed by the one or more processors of a mobile device, cause the one or more processors to:

parse the content of the social media application;

compare the parsed content to a trigger element database; and determine the selectable hotlink based on a match between at least a portion of the parsed content and the trigger element database.

20. The non-transitory, computer-readable medium of claim 17, further comprising instructions which, when executed by the one or more processors of a mobile device, cause the one or more processors to:

determine a location of the mobile device; and determine a language for detecting the content of the social media application based on the location.

* * * * *